E. E. WOODIN.
ROAD GRADING AND LEVELING DEVICE.
APPLICATION FILED SEPT. 11, 1912.
1,067,091.
Patented July 8, 1913.
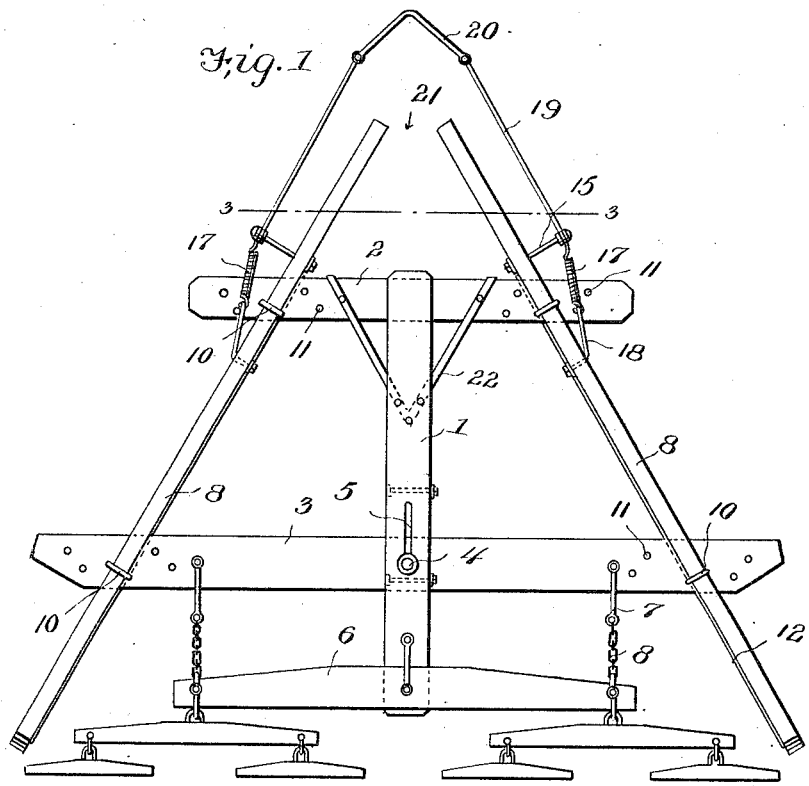
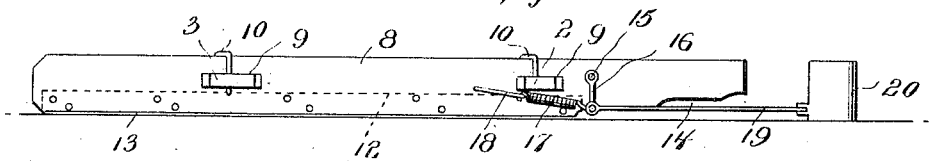
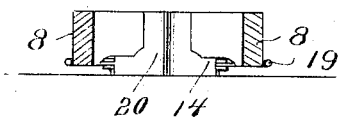
Inventor
Elmer E. Woodin.
Witnesses
By Victor J. Evans
Attorney

UNITED STATES PATENT OFFICE.

ELMER E. WOODIN, OF MECHANICSVILLE, NEW YORK.

ROAD GRADING AND LEVELING DEVICE.

1,067,091.      Specification of Letters Patent.      Patented July 8, 1913.

Application filed September 11, 1912. Serial No. 719,777.

*To all whom it may concern:*

Be it known that I, ELMER E. WOODIN, a citizen of the United States, residing at Mechanicsville, in the county of Saratoga and State of New York, have invented new and useful Improvements in Road Grading and Leveling Devices, of which the following is a specification.

This invention relates to road grading and leveling devices, and it has for its object to produce a device of this class which shall possess superior advantages in point of simplicity, durability and general efficiency.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

In the drawing,—Figure 1 is a top plan view of a device constructed in accordance with the invention. Fig. 2 is a side elevation of the same. Fig. 3 is a sectional view taken on the line 3—3 in Fig. 1.

Corresponding parts in the several figures are denoted by like characters of reference.

The frame of the improved implement is composed of a centrally located draft beam 1, on the rear end of which a spreader 2 is bolted or otherwise secured. A forward spreader 3 is adjustably connected with the draft beam by means of a fastening member, such as a bolt 4, for the passage of which the beam 1 is provided with a longitudinal slot 5, whereby adjustment of said forward spreader longitudinally with respect to the draft beam may be effected. The front end of the draft beam supports an evener 6 which is connected with the forward spreader by means of links 7 including springs 8 for the purpose of making a secure connection without interfering with the operation of the evener.

The implement includes two side members or wings 8, each of which is provided with slots 9 for the passage of the spreaders. The latter are connected with the wings by means of clips 10 for the passage of which each of the spreaders is provided with a plurality of pairs of apertures 11, thus enabling said spreaders to be adjusted at various angles with respect to each other and to the draft beam, and at various distances apart. Each of the wings is provided adjacent to its lower edge with a scraper 12, said scrapers being bolted on the external faces of the wings. The wings are also preferably shod with straps of band iron or steel, as indicated at 13. The lower edges of the wings are provided at the rear ends thereof with recesses 14 for the purpose of enabling the dirt which is gathered by the wings to escape. Each of the wings is provided near its rear end with an outwardly extending arm or bracket 15 with which a downwardly extending link 16 is pivotally connected. The lower end of said link is connected by a spring 17 with an arm 18 secured on the wing a suitable distance in advance of the arm 15. The lower ends of the links 16 at the two sides of the device are also connected by means of rods 19 with a V-shaped smoothing or leveling device 20 which is in this manner supported in rear of and a suitable distance behind the gap 21 between the rear ends of the wings. Braces 22 connect the draft beam with the rear spreader for the purpose of reinforcing the construction.

As will be seen from the foregoing description, taken in connection with the drawing hereto annexed, a grader and leveler has been provided of very simple construction, the wings or earth engaging members of which are capable of being readily adjusted as to width and also at various angles so as to enable said wings to be placed in the position most suitable for efficient operation. The dirt gathered by the wings when the machine is drawn over the road will escape through the recesses 14 and the gap 21 at the rear ends of the wings, and said dirt will be smoothed and leveled by the device 20 which is resiliently connected with the wings near the rear ends thereof.

The device, as will be seen, is extremely simple, and it has proven in practice to be thoroughly efficient for the purposes for which it is provided.

Having thus described the invention, what is claimed as new, is:—

1. In a machine of the class described, a pair of rearwardly converging wings having laterally extending arms, links depending from said arms, a smoother and leveler positioned in rear of and spaced from the wings, link rods connecting the smoother and leveler with the links, and springs connecting the links with the wings in advance of the arms.

2. In a machine of the class described, a pair of rearwardly converging wings, a substantially V-shaped smoother and leveler supported in rear of and spaced from the gap between the rear ends of the wings, and means for resiliently connecting the smoother and leveler with the wings.

In testimony whereof I affix my signature in presence of two witnesses.

ELMER E. WOODIN.

Witnesses:
 DAVID F. SMITH,
 GEORGE A. NESSLE.

Copies of this patent may be obtained for five cents each, by addressing the "Commissioner of Patents, Washington, D. C."